United States Patent [19]

Sionczewski

[11] 3,890,605

[45] June 17, 1975

[54] MAGNETIC DOMAIN SYSTEMS USING DOMAINS HAVING DIFFERENT PROPERTIES

[75] Inventor: John Casimir Sionczewski, Katonah, N.Y.

[73] Assignee: International Business Machines Corporation, Armonk, N.Y.

[22] Filed: June 29, 1973

[21] Appl. No.: 375,289

[52] U.S. Cl. 340/174 TF; 340/174 EB; 340/174 PM
[51] Int. Cl. .......... G11c 11/14
[58] Field of Search .......... 340/174 TF

[56] References Cited

UNITED STATES PATENTS 3,176,276 3/1965 Smith .......... 340/174 TF

OTHER PUBLICATIONS

Bell System Technical Journal, Vol. 51, No. 6, July–Aug., 1972 pp. 1427 to 1430.

Bell System Technical Journal, Vol. 51, No. 6, July–Aug., 1972 pp. 1440 to 1444.

IBM Technical Disclosure Bulletin Vol. 13, No. 10, Mar. 1971 p. 3021.

*Primary Examiner*—James W. Moffitt
*Attorney, Agent, or Firm*—Jackson E. Stanland

[57] ABSTRACT

A magnetic domain system utilizing domains having different wall magnetization properties. In particular, domains are herein characterized in accordance with their direction of motion in a gradient magnetic field which is substantially parallel to an easy axis of magnetization of the medium in which the domains exist. This deflection is in turn dependent upon the number of rotations of the magnetic moments in the domain wall, i.e., the total number and sign of the vertical Bloch lines present in the periphery of the domain. Magnetic systems are shown utilizing generators for producing domains of desired state, storage means for storing these domains, and sensing means for detecting the different states of the domains. Since multistate magnetic domains are generated, various levels of logic circuitry can be designed. Examples include ternary logic systems and functional memories.

32 Claims, 16 Drawing Figures

MAGNETIC DOMAIN SYSTEMS USING DOMAINS HAVING DIFFERENT PROPERTIES

CROSS-REFERENCE TO RELATED APPLICATIONS

Copending application Ser. No. 375,285, filed the same day as the present application and assigned to the present assignee describes magnetic domain systems using hard and soft magnetic domains, where the hard domains are characterized by having numerous vertical Bloch lines in the domain walls while the soft domains have few or no Bloch lines in their domain walls. These different domain states are distinguished by their different collapse properties in a bias field, by mobility differences, or by their different sizes. Systems using these hard and soft domains are described.

BACKGROUND OF THE INVENTION

1. Field of the Invention

This invention relates to magnetic domain systems, and more particularly to systems using multistate magnetic domains where the various states of the domain are characterized by their movements in a gradient magnetic field directed substantially parallel to an easy direction of magnetization of the magnetic medium in which they exist.

2. Description of the Prior Art

Magnetic bubble domain systems are known in the art as exemplified by U.S. Pat. Nos. 3,701,125 and 3,689,902. In such systems, magnetic domains comprising a single domain wall which is closed upon itself and of generally cylindrical shape are used. These domains have magnetization perpendicular to the magnetic sheet in which they exist and oppositely directed to the magnetization of the sheet. The magnetization in the domain wall has generally been assumed to be of the Bloch wall type lying in the plane of the magnetic sheet and also in the plane of the domain wall. Further, these domains have been characterized by movement in the direction of a gradient magnetic field applied to them.

Systems using the aforementioned domains have been provided and have demonstrated many functions, including storage, writing, reading, splitting, propagation, busting, generation, etc. In these systems, information is generally presented as the presence and absence of bubble domains which of course lends itself to binary data uses.

Additionally, apparatus using different types of domains for storage of information is shown in copending application Ser. No. 319,130, filed Dec. 29, 1972. In that application, domains having different apparent sizes are used to represent different information states, in contrast with the usual bubble domain systems where the presence and absence of domains is used to represent information.

Another bubble domain apparatus using different types of domains is shown in a publication by George Henry which appears in the IBM Technical Disclosure Bulletin, Vol. 13, No. 10, p. 3021, March 1971. In that publication, domains represent different information states in accordance with the direction of circulation of their domain wall magnetization.

While such systems are very useful, the present invention seeks to use a newly discovered phenomenon that at least two types of magnetic bubble domains exist in the same magnetic sheet simultaneously and that these two different domain types have dissimilar properties which serve to distinguish them from one another.

These different domains have different numbers of vertical Bloch lines, which may roughly be thought of as vertical lines of twist in the wall magnetization, separating any two areas of the wall which have opposite directions of Bloch wall magnetization. More importantly, these different domains have different directions of movement in an applied gradient magnetic field.

In a recent article by A. P. Malozemoff, *Applied Physics Letters* 21, 149 (1972) it was shown that if there are enough vertical Bloch lines along the domain wall of a bubble domain, then the domain wall will collapse at a higher bias field than one with a smaller number of vertical Bloch lines. In addition, the diameter and mobility may be different depending on the number of vertical Bloch lines.

Additionally, bubble domains having different motions in an applied gradient field were discussed at the Electrochemical Society Meeting in Houston, Tx., May 8, 1972, by A. H. Bobeck. That author attributed the angle of deflection of the bubble domains to the number of Bloch lines existing in a domain wall.

It has been thought that the presence of such Bloch line bubble domains is a serious problem in systems utilizing bubble domains. That is, prior efforts have been directed to systems of the type known in the past where domains were thought to move always in the direction of the gradient of the applied magnetic field. The discovery that some domains did not move in the direction of the gradient caused concern among people working in the field of magnetic bubble domains, since this would render present systems unworkable. Consequently, researchers have tried to suppress these types of bubble domains. In particular, reference is made to the following references which show various techniques for suppressing these Bloch line bubble domains.

A. H. Bobeck et al, Bell System Technical Journal 51, No. 6, July/August 1972, page 1431.

R. Wolfe et al, Bell System Technical Journal 51, No. 6, July/August 1972, page 1436.

A. Rosencwaig, Bell System Technical Journal 51, No. 6, July/August 1972, page 1440.

The present invention takes an entirely different approach and seeks to utilize these different types of magnetic bubble domains which are heretofore thought detrimental for use in any practical apparatus. Thus, the present invention provides information handling apparatus where the different motions of magnetic bubble domains in a gradient magnetic field are used for representation of different information states. In addition, the present inventor has recognized an important property heretofore unrecognized. This property concerns the angle of deflection of certain bubble domains in a gradient magnetic field. It has been discovered that the angle of deflection is a function of the number of rotations of wall magnetization around the periphery of the domain wall; therefore, magnetic domains having very small numbers of vertical Bloch lines can be used rather than having to resort to domains having vastly dissimilar numbers of vertical Bloch lines in their domain walls.

While different deflection angles of motion of magnetic bubble domains can be obtained by using bubble domains having vastly different numbers of vertical Bloch lines, the use of bubble domains having large numbers of vertical Bloch lines is disadvantageous, since these domains tend to be large and to move more slowly in the magnetic medium. It was not recognized in the prior art that bubble domains having small numbers of vertical Bloch lines can be distinguished on the basis of their behavior in a gradient magnetic field, thereby allowing the use of bubble domains which have approximately the same size and the same mobility in the magnetic medium. For instance, a bubble domain which moves in the direction of the gradient is one having −2 Bloch lines, in contrast with the previously believed notion that bubble domains having zero vertical Bloch lines were those which moved in the direction of the applied gradient. Accordingly, a very simple, three-state information system can be provided using bubble domains having −2 vertical Bloch lines, zero vertical Bloch lines, and +2 vertical Bloch lines. These domains will all have the same static properties and will move with equal ease in the magnetic material. However, they are easily distinguished by their direction of movement in an applied gradient field, thereby leading to useful magnetic bubble domain systems.

Accordingly, it is an object of the present invention to provide magnetic domain system using domains having different wall magnetization states.

It is a further object of this invention to provide a magnetic bubble domain system which is stable and which uses magnetic bubble domains having different wall magnetization states.

It is a still further object of this invention to provide a magnetic bubble domain system using magnetic bubble domains of different wall magnetization in which simple and reliable structures can be used to provide numerous functions.

It is another object of this invention to provide information handling apparatus using magnetic bubble domains which have different motions in an applied gradient magnetic field.

It is still another object of this invention to provide information handling apparatus which utilizes magnetic domains having different amounts of rotation of their wall magnetization.

BRIEF SUMMARY OF THE INVENTION

In general, a magnetic system is provided using a magnetic medium in which various types of magnetic domains can be created and utilized. The magnetic medium is any one which supports magnetic bubble domains and includes known materials such as rare earth iron garnet systems, and amorphous magnetic films.

Means are provided for generating domains having different numbers of vertical Bloch lines in their domain walls. These Bloch lines are regions in which the magnetization of the domain wall changes from one tangential direction (sense) to the other tangential direction. The generating means provides domains having varying numbers of Bloch lines, and domains in which the number of rotations of the magnetic moments in the domain wall varies. Thus, it is possible to provide domains having walls containg n Bloch lines, where $n = 0 \pm 2, \pm 4$, etc. The vertical Bloch lines must exist in pairs and they can have either positive or negative sign depending upon the convention chosen.

Means are provided to move the domains so that their different dynamic properties will be manifested. This means generally comprises means for producing a magnetic field substantially normal to the magnetic material and having a gradient along a direction parallel to the magnetic material. That is, the magnitude of the perpendicular magnetic field at one location in the magnetic material is different than that at another location in the magnetic material. Domains traveling under the influence of this gradient magnetic field will move in accordance with the number of rotations of the magnetization vectors in their domain walls. This deflection will be through an angle which is either positive or negative with respect to a reference direction, depending upon the convention chosen for measuring the vertical Bloch lines in the domain wall.

The means for creating the gradient field can generally be comprised of current-carrying conductors, permanent magnets, or magnetic layers attached to the magnetic material and exchange coupled thereto. In addition, the magnetic properties of the magnetic material can be graded, as for instance by ion implantation or diffusion of impurities in a localized region. All of these are well known techniques for producing gradient magnetic fields.

Means are provided for propagating and storing the domains, regardless of their different dynamic properties. In particular, various conventional structures are used for propagating and storing the domains. Such means includes magnetically soft patterns adjacent to the magnetic material in which the domains exist, and current-carrying loops. Additionally, well known angelfish patterns can be used to move these multistate domains in a conventional manner.

Means are provided for detecting the domains by the use of their different dynamic properties. The detection means can comprise means for producing a gradient magnetic field and any type of known sensing means such as magnetoresistive sensors. Thus, complete domain systems can be provided, and various logic functions are readily available using multistate domains having different wall magnetic moment rotation properties.

These and other features, advantages and objects will be more apparent in the following more particular description of the preferred embodiments.

BRIEF DESCRIPTION OF THE DRAWINGS

FIG. 1A shows a magnetic bubble domain having no Bloch lines in its domain wall, while

FIG. 2A shows one possible sense of rotation of the Bloch lines in the domain wall of FIG. 1B, while

FIG. 6A illustrates how a domain having Bloch lines therein is created while

DETAILED DESCRIPTION OF THE PREFERRED EMBODIMENTS

Until recently, domain walls in thin magnetic layers of bubble domain material were always assumed to be of the simple Bloch type, with the average wall moment lying in the plane of the wall in the film and having the same sense around the entire domain wall. Typically, in the absence of interactions with other domains, this type of normal domain runs out to an infinitely long stripe below a certain critical bias field exerted normal to the magnetic medium in which the domains exist. At bias fields above this magnitude, the stripe domain runs in to form a bubble domain whose diameter shrinks in a characteristic way with increasing bias field and which eventually collapses above a second critical field magnitude.

In contrast with normal domains of the simple Bloch type, domains can exist in which two opposite directions of wall moment can exist. The transition regions between these oppositely directed regions of magnetization are called Bloch lines. Recently, hard magnetic bubble domains have been observed which have sufficient numbers of Bloch lines therein and which collapse at higher bias fields than do normal bubble domains. These effects are attributed to the mutual repulsion of neighboring vertical Bloch lines in the domain walls. Additionally, the radial mobility of hard domains is reduced by a significant factor in contrast with normal domains even in a low-loss material. Systems utilizing these hard and soft domains are described in more detail in the aforementioned copending application, Ser. No. 375,285.

Figure 1A:
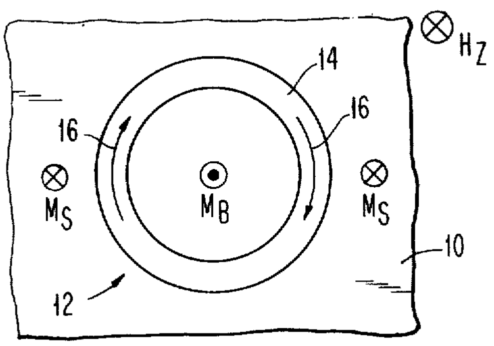

In mome detail, FIG. 1A shows a portion of a magnetic sheet 10 such as a garnet film, in which a magnetic domain 12 is indicated by the domain wall 14. FIG. 1A, as well as FIGS. 1B, 2A, 2B and 3 are views of the magnetic medium 10 and domain wall 14, taken along a midplane of medium 10. That is, these figures represent the domain wall at a plane approximately mid-way in the medium thickness. The magnetization $M_S$ of sheet 10 is directed downwardly while the magnetization $M_B$ of domain 12 is directed upwardly. A bias field $H_Z$ exists across the magnetic sheet. The magnetization vectors of domain wall 14 are indicated by the arrows 16 which are in the same direction around the periphery of wall 14. In this domain there are no regions of oppositely directed magnetization in the domain wall and consequently, no vertical Bloch lines exist in this domain. However, as will be appreciated later, this domain has wall magnetic moments having a revolution associated therewith which will cause the domain to deflect in a gradient magnetic field.

Figure 1B:
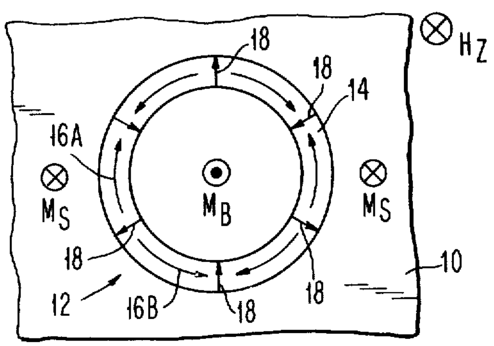
FIG. 1B shows a magnetic bubble domain having Bloch lines in its domain wall.

FIG. 1B illustrates a second type of magnetic bubble domain. For ease of illustration, the same reference numerals will be used wherever possible. Accordingly, magnetic sheet 10 has magnetization $M_S$ directed downwardly while domain 12 has magnetization $M_B$ directed upwardly. A bias field $H_Z$ exists across the entire magnetic sheet 10. The domain 12 of FIG. 1B is contrasted with domain 12 of FIG. 1A in that domain wall 14 of FIG. 1B has regions of magnetization which are oppositely directed. For instance, this is illustrated by magnetization vectors 16A and 16B which are in opposite directions. Located between magnetization 16A and 16B is a vertical Bloch line, illustrated by arrow 18. In FIG. 1B, there are other regions of oppositely directed magnetization in domain wall 14, and a plurality of vertical Bloch lines 18 exist. As will be more apparent later, Bloch lines must exist in pairs so that the total number of Bloch lines will be an even number.

A Bloch line is defined as the transition region between any two areas of the domain wall having the two different wall magnetization directions possible for a Bloch wall in bubble film. In this transition region, there is always a point where the wall magnetization lies normal to the plane of the domain wall. Accordingly, the position of the Bloch line is defined by the locus of the points where the wall magnetization is normal to the plane of the domain wall.

A vertical Block line is defined as a Bloch line which extends substantially the full height of the bubble domain. In the case of a magnetically uniform sheet of bubble domain material, a vertical Bloch line will extend from the top surface of the sheet to the bottom surface of the magnetic sheet. However, the wall magnetization may be altered somewhat at the surfaces of the bubble domain material due to stray surface magnetic fields, as explained by J. Slonczewski at the Conference on Magnetism and Magnetic Materials, Chicago, Ill., November 1971 (published in the Conference Proceedings, No. 5, 1971). Therefore, the vertical Bloch line more correctly can be thought to extend from near the top surface of the bubble domain material to near the bottom surface of the bubble domain material, in the case of a magnetic material which has uniform magnetic properties throughout its depth.

Figure 2A:
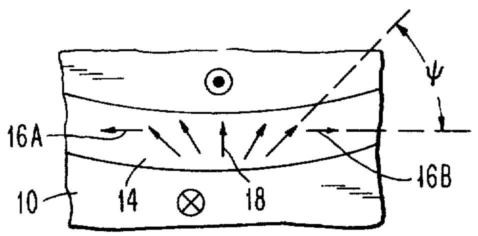
Figure 2B:
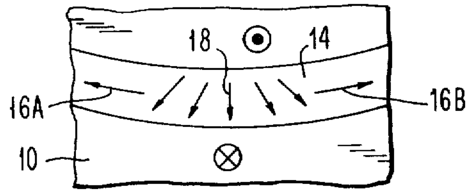
FIG. 2B shows another possible sense of rotation of the Bloch lines in the wall of FIG. 1B.

FIGS. 2A and 2B illustrate the two types of rotation which can exist for the magnetization between two regions of oppositely directed magnetization in a domain wall 14. In these figures a complete domain wall is not shown. For ease of illustration Bloch lines are "twist" regions between oppositely directed magnetization. For instance, magnetization directions 16A and 16B are oppositely directed in FIG. 2A. The magnetization vectors will rotate in order to provide a transition region between the oppositely directed magnetization regions, with an angle $\Psi$ of wall magnetization in the film plane. The vertical line of transition between right-handed and left-handed Bloch walls is illustrated by the vector 18.

In FIG. 2B, the magnetic moments (magnetization vectors) rotate in the opposite direction between the oppositely directed magnetization vectors 16A and 16B. Thus, vertical Bloch lines having different signs can be produced. On the one hand, the Bloch line 18 of FIG. 2A may be termed a "plus" Bloch line while that of FIG. 2B may be termed a "negative" Bloch line.

The vertical Bloch lines have a characteristic width of $\Delta BL = \sqrt{A/2\pi M^2}$ in the limit of large (1)

$Q = KA\pi M^2$. (2)

Here,

A is the exchange energy constant

M is the magnetization

K is the uniaxial anisotrophy.

In this limit the Bloch line energy is only a fraction of the normal wall energy and cannot therefore be expected to have large effect on the static properties of a domain. However, this result is modified if interactions between Bloch lines are considered. Two adjacent Bloch lines are attracted to each other by magnetostatic forces and, if they have opposite handedness (sign) they can annihilate leaving a pure Bloch wall. However, if they have the same handedness they will repel each other due to exchange forces. Therefore, in a domain with n Bloch lines all of the same handedness, the exchange energy can become significant when the perimeter P of the domain is reduced to the point where the Bloch lines crowd in against each other and the actual Bloch line width is constrained to be less than the width of an isolated Bloch line. In this limit the wall magnetization rotates at a constant rate along the wall perimeter; that is, the angle Ψ approaches $n\pi x/P$ where $x$ is the distance along the wall perimeter for large n.

As mentioned previously, the number of Bloch lines n must be an even number for in a physical system when $x = P$, Ψ must have increased by an integer multiple of $2\pi$. Therefore, the extra exchange energy due to the interacting Bloch lines is given by the following expression:

$$E_{BL} = 2A\Delta\ (\delta\Psi/\delta x)^2\ \mathrm{Ph} \quad (3)$$

$$= 2n^2\pi^2 A\Delta h/P$$

where $h$ is the film thickness

Δ is the Bloch line width $\Delta = \sqrt{A/2\pi M^2}$

Figure 3:
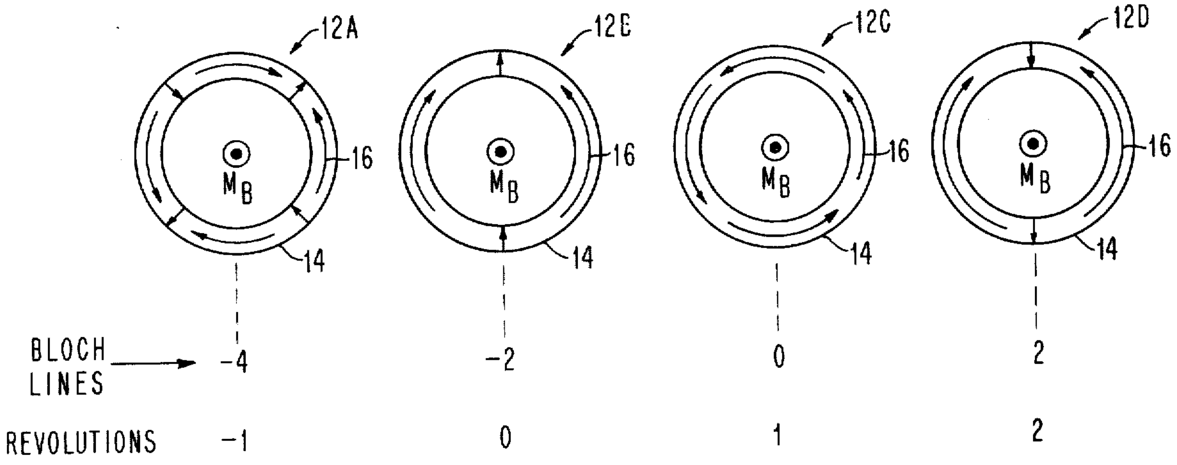
FIG. 3 shows domain walls having various numbers of Bloch lines therein and the number of revolutions contained in each of the domain walls.

The present invention relies upon the fact that domain walls having vertical Bloch lines or no vertical Bloch lines will be moved in a gradient magnetic field in accordance with the number of revolutions of the wall moment in a domain wall as one proceeds around the periphery of the wall. This is illustrated more particularly in FIG. 3 which shows four magnetic domains having varying Bloch line configurations. In FIG. 3, the same reference numbers will be used as were used previously, except that the four different domains are given the designations 12A, 12B, 12C, and 12D. Beneath each domain is a column of numbers indicating the number of vertical Bloch lines in the domain wall, the sign of these Bloch lines, and the number of revolutions of the wall moment as one proceeds around the periphery of the domain wall. For purposes of this explanation, when the wall moment rotates counter clockwise as one proceeds around the domain wall, the revolution is considered positive. If the rotation is in a clockwise direction, it is considered negative. The sign applied to the Bloch lines anad to the rotation is arbitrary, and does not have a bearing on device applications.

In more detail, domain 12A has −4 Bloch lines and −1 revolution. These revolutions are determined by rotating a wall moment vector around the domain wall and noting the number of complete revolutions made. The sign of the Bloch lines is determined in accordance with the convention established by FIGS. 2A and 2B. In FIG. 2A, a "negative" Bloch line is shown while in FIG. 2B, a "positive" Bloch line is shown.

Domain 12B has −2 Bloch lines and zero revolutions of the angle Ψ. This is the bubble domain which behaves in the same manner as previously known bubble domains since it moves parallel to a gradient magnetic field applied to medium 10.

Domain 12C has zero vertical Bloch lines but one revolution of the angle Ψ. Thus, what was generally considered a "normal" movement domain is really a domain which undergoes a transverse deflection in an applied gradient field.

Domain 12D has +2 vertical Bloch lines and 2 revolutions of the angle Ψ. A domain having two rotations of its wall moment will undergo a deflection approximately twice as much as a domain having one rotation (zero Bloch lines) when placed in a gradient magnetic field.

DEFLECTION OF MAGNETIC DOMAINS

Figure 4A:
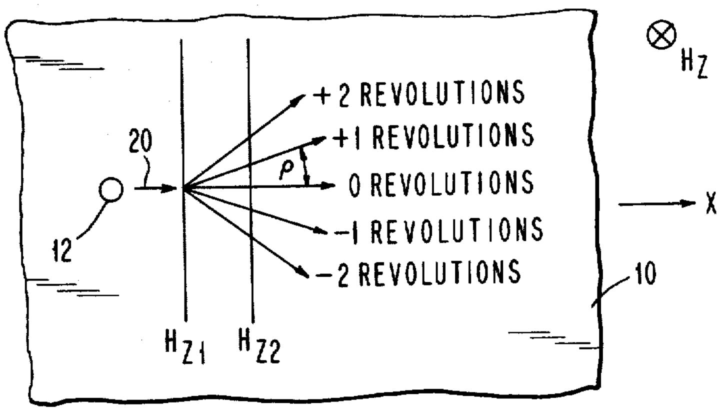
FIG. 4A illustrates how a magnetic domain deflects in a gradient magnetic field in accordance with its number of revolutions, while this result is also illustrated graphically by FIG. 4B.
Figure 4B:
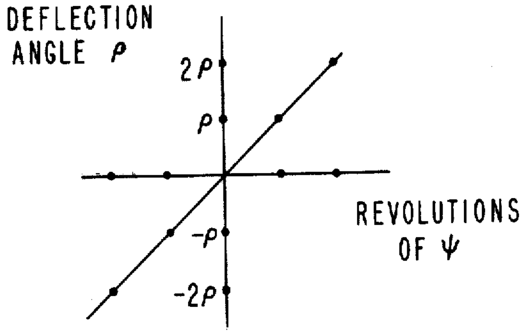

FIGS. 4A and 4B illustrate the deflection of magnetic domains in a gradient magnetic field in accordance with the number of revolutions of the angle Ψ around the periphery of the domain wall. The gradient of the magnetic field is along the plane of the magnetic medium 10 and is assumed to be in the X direction in FIG. 4A. Therefore, the deflection angle $\rho$ is an angle measured from the X direction.

In FIg. 4A a domain 12 moves in the X direction as indicated by arrow 20. The two lines marked $H_{Z1}$ and $H_{Z2}$ indicate different amplitudes of bias magnetic field $H_Z$, as measured in the X direction. As will be noted by reference to FIG. 4A, domains having zero revolutions of wall moment (−2 Bloch lines) are not deflected in the gradient field while all other domains undergo a deflection away from the direction of the gradient. Depending upon whether the number of revolutions of Ψ is plus or minus, the sign of the deflection angle $\rho$ is plus or minus.

The deflection angle $\rho$ is plotted against the number of revolutions of the angle Ψ in FIG. 4B. Generally, the deflection angle is directly dependent upon the number of revolutions of the angle Ψ but is not a simple function of only the number of revolutions of Ψ.

For a more detailed explanation of the theory underlying the deflection of domains having revolutions of the angle Ψ, reference is made to the aforementioned publication of J. C. Slonczewski et al which appeared in the 18th Annual Conference on Magnetism and Magnetic Materials, held in Denver, Co., Nov. 28–Dec. 1, 1972. The following is merely a brief explanation of the theory which describes the behavior of the domains in the gradient magnetic field.

The number of rotations of the angle Ψ is $(n/2)+1$, where $n = 0, \pm 2, \pm 4$, etc., is the number of vertical Bloch lines in the domain wall. The deflection angle $\rho$ of the domains is proportional to the number of vertical Bloch lines in the domain and generally increases as the number of such Bloch lines increases. In addition to its dependence on the number of Bloch lines, the deflection depends upon damping associated with the bubble domain material, the diameter of the domains, and the gyromagnetic constant $\gamma$. The deflection angle is inversely proportional to the damping of the material so that, as the damping increases the deflection angle decreases. For a large number of vertical Bloch lines in the domain wall the deflection angle can approach 90°.

The use of bubble domains which deflect at large angles, such as 90°, enables a designer to provide intersecting propagation paths at different angles with respect to each other. For instance, a gradient field may cause some bubbles to deflect 90°, while other bubbles are not deflected at all. Thus, the direction of propagation can be changed by a very simple structure which produces a gradient magnetic field.

The gradient magnetic field causes a Larmor precession of the magnetic moments in the domain wall which in turn causes a force on the domain in a direction normal to the direction of the gradient in the applied field. This combines with the force in the direction of the gradient of the field to cause a deflection of the domain.

Figure 5:
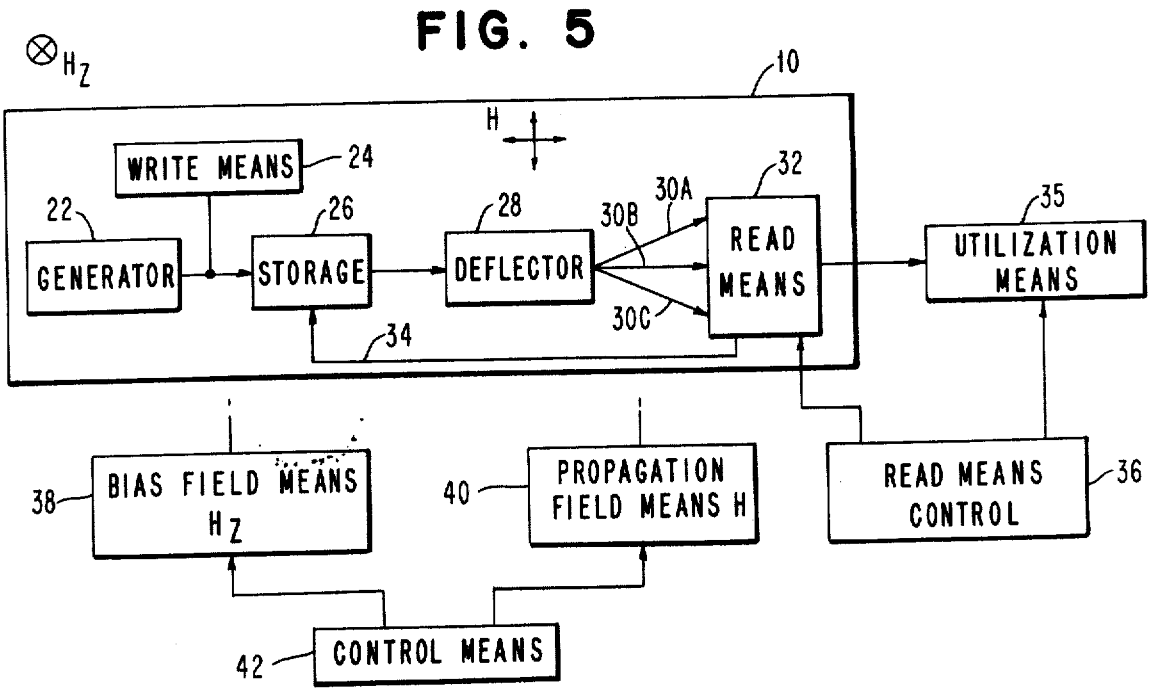
FIG. 5 shows a block diagram of an information handling system in which magnetic domains having multistate properties are utilized.

FIG. 5 shows a complete system using magnetic domains having different dynamic properties. Generally, the magnetic sheet 10 in which the domains exist has various components associated therewith for providing different system functions. For instance, the generator 22 provides domains having different dynamic properties and the write means 24 controls the entry of these domains into the storage unit 26. The domains can be selectively taken from storage and sent to a deflector 28 where they are deflected into different paths 30A, 30B, 30C, etc., depending upon their wall-moment rotational properties (rotation of Ψ). This separate domains having different properties so that they can be individually detected by read means 32, which can be comprised of any type of magnetic domain sensing equipment, such as magnetoresistive sensors. After being detected, the domains are either destroyed, sent to further circuitry, or returned to storage 26 via path 34, as is indicated here. A signal indicating the types of domains detected is sent to the utilization means 35. The read means 32 is under control of a read means control 36, which provides selective detection of the different domains and which provides a signal to the utilization means 35 to indicate the type of domain being sensed (and hence, the information state represented by that domain).

A conventional bias field means 38 is utilized to provide a magnetic bias field $H_Z$ normal to magnetic material 10. Additionally, the propagation field means 40 provides reorienting magnetic field H in the plane of magnetic material 10, when such a field is used for provision of circuit functions. Bias field means 38 and propagation field means 40 operate under control of a control means 42, as is well known.

DOMAIN GENERATION

This section deals with the production of domains having certain numbers of Bloch lines. and more particularly certain rotations of the angle Ψ. In the circuitry to be described, various informational states are represented by domains having different degrees of deflection in a gradient magnetic bias field. For instance, domains which have no deflection (zero rotation domains) may be given one informational value, while domains having plus and minus deflections of $\rho$ can be given other informational state values. In this way, it is possible to provide multistate informational levels where the various states are well quantized and can have many values depending upon the type of domain walls which are provided.

In order to obtain high data rates and to use the same propagation circuitry for all the domains in the system, it is generally preferable to utilize domains which do not deflect greatly from a reference direction (for instance, the reference direction is conveniently the path of the zero rotation domain). In this case, domains having deflections of $+\rho$ and $-\rho$ form a complete logical subset with domains having zero deflection. Of course, the zero deflection domain need not be chosen in the informational scheme. It is only necessary to choose domains having deflections which are not too widely different in order to provide controlled, high-speed propagation using the same structure for movement of all domains.

However, as the velocity of the bubble domains decreases (smaller data rates) the deflection angle $\rho$ decreases. Thus, domains having greatly different rotations of wall moment can still use the same propagation structure if the velocity of the domains is adjusted to make this possible. One way to achieve this is to reduce the frequency of the driving pulses or by increasing the damping of the magnetic medium.

Figure 6A:
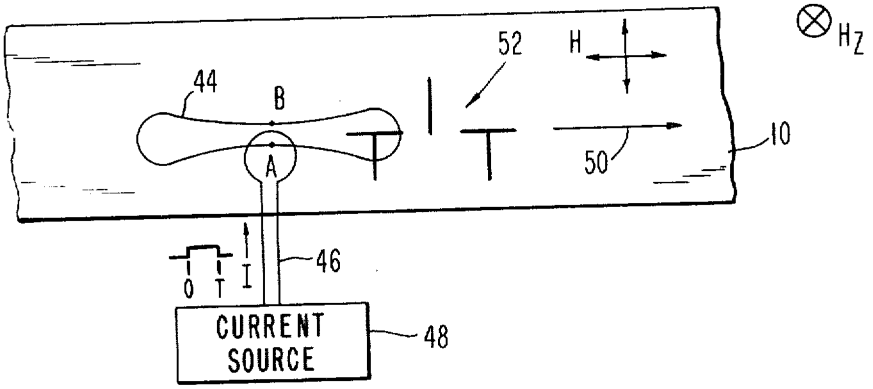

FIG. 6A indicates the generation of a Bloch line bubble domain based on the splitting of a stripe domain 44 which exists in the magnetic sheet 10. A current pulse I having a width T is provided in loop 46 by current source 48. The loop is so arranged with respect to domain 44 that a different magnetic field normal to medium 10 exists at point A than exists at point B. That is, it is considered important to have the net bias field at point A be different than that at point B (bias field difference on both walls of the domain 44). If the magnetic field applied by current I is symmetric on both wall surfaces of domain 44, the domains generated by the splitting operation may not contain vertical Bloch lines, since symmetry may cause the Bloch lines to annihilate each other around the periphery of the domain wall.

When the current pulse I is generated in coil 46, a gradient in the net magnetic bias field $H_Z$ exists from point A to point B. This generates twisting in the magnetic amounts in the domain wall due to Larmor precession of these moments. To a first approximation, the net number of vertical Bloch lines ($n_{net}$) produced in a domain which has been split from the stripe domain 44 is given by the following expression:

$$n_{net} = n_B - n_A = 1/\pi\gamma T(H_{ZB} - H_{ZA}),$$

where $n_{net} = 0, \pm2, \pm4 \ldots$

- $\gamma$ is the gyromagnetic ratio of the material (magnetic moment/spin angular momentum);
- $H_{ZB}$ is the net magnetic bias field at point B;
- $H_{ZA}$ is the net magnetic bias field at point A;
- $n_B$ is the number of vertical Bloch lines produced at point B;
- $n_A$ is the number of vertical Bloch lines produced at point A.
- For garnet materials, $\gamma$ is typically $10^7$ 1/sec.-Oe. For a current pulse I of 0.1 microsecond, $T = 10^{-7}$ seconds, and for $H_{ZB}-H_{ZA} = 6$ Oe, the equation above yields $n_{net} = 2$. Thus, it is apparent that the number of vertical Bloch lines created in a split magnetic domain is related to the width of the current pulse applied to do the splitting and the gradient field produced by that current pulse.

It should be understood that the stripe domain may be split by means other than a current pulse. For instance, a soft magnetic material adjacent the domain may have a magnetic charge created therein when a magnetic field reorients in the plane of the magnetic material. This will produce a gradient field across the stripe domain which will cause splitting in the same manner as was described with respect to the current-carrying conductor 46 of FIG. 6A. Additionally, another magnetic domain can be brought into the vicinity of domain 44 to provide the splitting action. In these cases, the duration of the magnetic field produced by either the magnetic material or the adjacent magnetic domain is used for the quantity T in the previous equation.

For the creation of domains having small numbers of Bloch lines, a succession of short current pulses is probably desirable. As an alternative, domains can be created by normal generating means and these can be separated statistically in terms of the number of rotations which are present. A deflection scheme is used to separate the domains depending upon their rotations, and the domains are then stored for later use. This will be shown in more detail later.

After the splitting operation produced by the current pulse I, a split domain having the desired number of vertical Bloch lines in its domain wall is propagated to the right in the direction of arrow 50 by the propagation means 52, which here comprises T and I-bars which operate to produce attractive magnetic poles in response to the orientations of in-plane magnetic field H. The remaining split domain can then be expanded by lowering the bias field $H_Z$, then can be split again to provide another domain having the desired number of vertical Bloch lines therein.

Figures 6B, 6C, 6D:
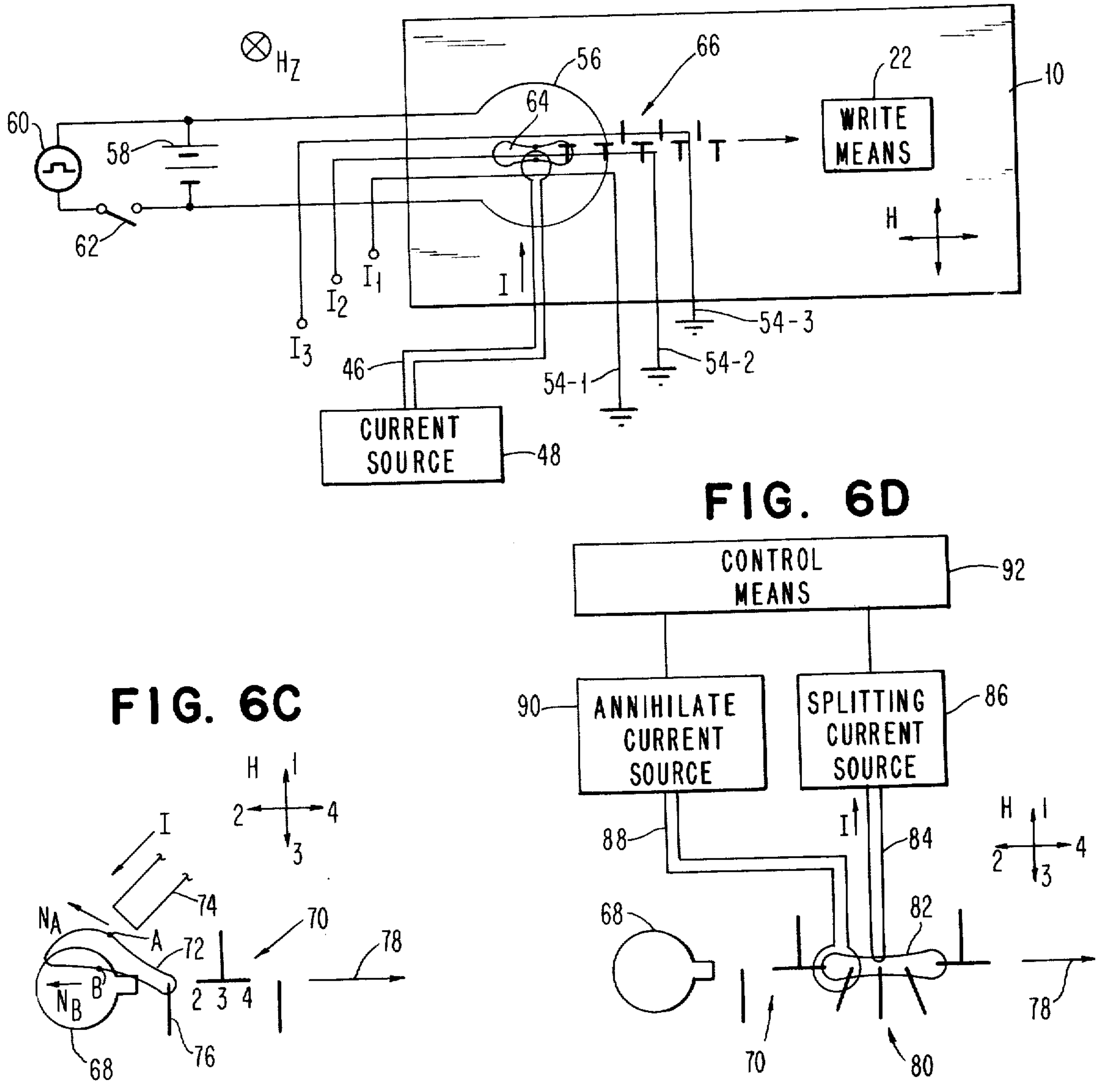
FIG. 6B shows an actual device for doing this.
FIGS. 6C and 6D illustrate additional means for creating Bloch line bubble domains where patterns of magnetically soft elements are utilized.

FIG. 6B shows an embodiment for providing domains having the desired number of Bloch lines in their domain walls. The current-carrying conductor 46 and current source 48 of FIG. 6A is generally used.

In FIG. 6B, current pulses $I_1$, $I_2$, and $I_3$ are provided in conductors 54–1, 54–2, and 54–3, in order to provide attractive fields to move domains into the area within conductor loop 56. Loop 56 is connected to a dc source 58 and to a pulse source 60 via switch 62. Current in loop 56 reduces the net bias field within this loop, causing a domain therein to become stripe domain 64.

After a stripe domain 64 is created in loop 56, a current pulse I is produced in conductor 46 by current source 48. This splits domain 64 in the manner described with respect to FIG. 6A. The split domain then propagates to the right under control of the propagation means 66, which is shown here at a T and I-bar circuit.

FIG. 6C and FIG. 6D show two other means for creating domains having the desired number of wall moment rotations. The structures in both FIGS. 6C and 6D utilize magnetically soft materials for creation of these domains.

In more detail, FIG. 6C shows a conventional domain generator using a disc 68 comprised of soft magnetic material, such as permalloy. Associated with disc 68 is a propagation means 70 generally comprising T and I-bar elements Disc 68 has a domain 72 associated therewith which travels around the periphery of disc 68 as the propagation field H rotates in the plane of the magnetic sheet 10 (not shown in this drawing). Located adjacent to disc 68 is a current-carrying conductor 74 in which a current I can travel. Conductor 74 is used to create a net magnetic bias field at point A on domain 72 which is different than the net magnetic bias field at point B on domain 72.

In operation, domain 72 is stretched to I-bar 76 as magnetic field H rotates. At this time, current I flows in conductor 74 and produces a magnetic field which is different at point A than at point B. This means that a different number $n_A$ of vertical Bloch lines travel along the near surface of domain 72 than the number of Bloch lines $n_B$ traveling along the far surface of the domain wall. In the manner described previously, a split domain is created having the desired number of vertical Bloch lines (and, more importantly, the desired number of rotations of $\Psi$) which propagates to the right in the direction indicated by arrow 78 as magnetic field H rotates.

FIG. 6D shows another embodiment using magnetically soft materials. Since many of the components are similar to those shown in FIG. 6C, the same reference numerals will be used whenever possible.

In more detail, a magnetically soft disc 68 produces domains in a conventional manner as magnetic field H rotates in the plane of magnetic material 10 (not shown). The domains split from disc 68 travel to the right along the direction indicated by arrow 78, under the control of the propagation means 70. The propagation means 70 includes a domain expander, generally indicated by numeral 80, which is comprised of three bars of magnetically soft material. A domain traveling along propagation means 70 is stretched by the attractive charges produced on the ends of these bars when the magnetic field is along direction 1. This produces a stripe domain 82. As shown previously, a current I produced in conductor 84 by splitting current source 86 will split the domain 82. One portion of the split will travel to the right along the direction of arrow 78. The other portion of the split domain is annihilated by current in conductor 88, produced by annihilate current source 90. Both splitting current source 86 and annihilate current source 90 are activated at the proper times by a control means 92.

Figure 6E:
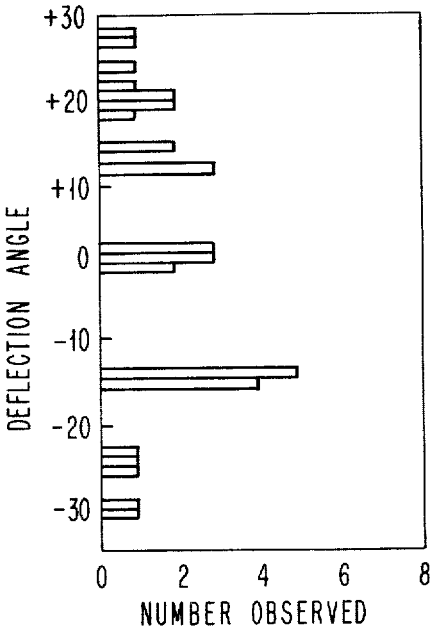
FIG. 6E is a histogram illustrating the statistical distribution of domains created by the technique of FIG. 6A.

FIG. 6E is a histogram of the deflection angles of bubble domains in a pulsed gradient field in a garnet sample. This histogram is an indication of where bubble domains fall on a quantitative basis, and is not the result of a specific nucleation experiment. In this case, the sample was a garnet film 5.25 microns thick having the general composition $Tb_{0.04}Eu_{0.66}Y_{2.3}Fe_{3.85}Ga_{1.15}O_{12}$.

FIG. 6E provides an indication of the different dynamic properties of bubble domains in this particular sample. a pulse magnetic field in the Z direction (normal to sheet 10) was produced by a current-carrying coil. Domains within the coil area were chopped by this field, and the chopped domains were propagated in the magnetic sheet. Some of these domains were then analyzed to determine their movement in a gradient magnetic field. The histogram of FIG. 6E indicates the quantization of deflection angle of these domains, but does not establish the amplitude of the peaks observed at various deflections.

The histogram of FIG. 6E shows pronounced peaks at deflection angles $\rho = 0, -14 \pm 1$, and $13 \pm 1$, as well as indications of other peaks at larger angles. This pattern persisted even with a variety of nucleation conditions. Thus, the appearance of vertical Bloch line bubble domains is quantized in garnet films. Even if a bubble domain behaves statically like a "prior art" bubble, it may contain at least a few vertical Bloch lines. That is, the static behavior of domains with small numbers of Bloch lines is such that they collapse readily as the bias field is increased. However, domains with many vertical Bloch lines tend to resist collapse at the same value of the magnetic bias field which caused domains with few Bloch lines to collapse. Thus, static properties are dependent upon the number of Bloch lines present in the domain wall. However, even domains having similar static behavior may have different wall-moment rotations and different deflections in a gradient magnetic field. Consequently, it is only necessary to work with bubble domains having a small number of vertical Bloch lines in order to provide multilevel informational states. This has an advantage, since domains with small numbers of these Bloch lines are apt to be smaller, and the deflections are not as great. In this case it is possible to use the same propagation circuitry for movement of all domains, even at high velocities. On the other hand, domains having greatly different deflection properties are easier to separate in a gradient magnetic field and the deflection circuit needs only a small amount of area to provide sufficient deflections for good resolution. consequently, domains having varying numbers of Bloch lines, and more importantly wall moment rotations, will be selected according to design choice in each particular instance.

DEFLECTION AND STORAGE

Figure 7:
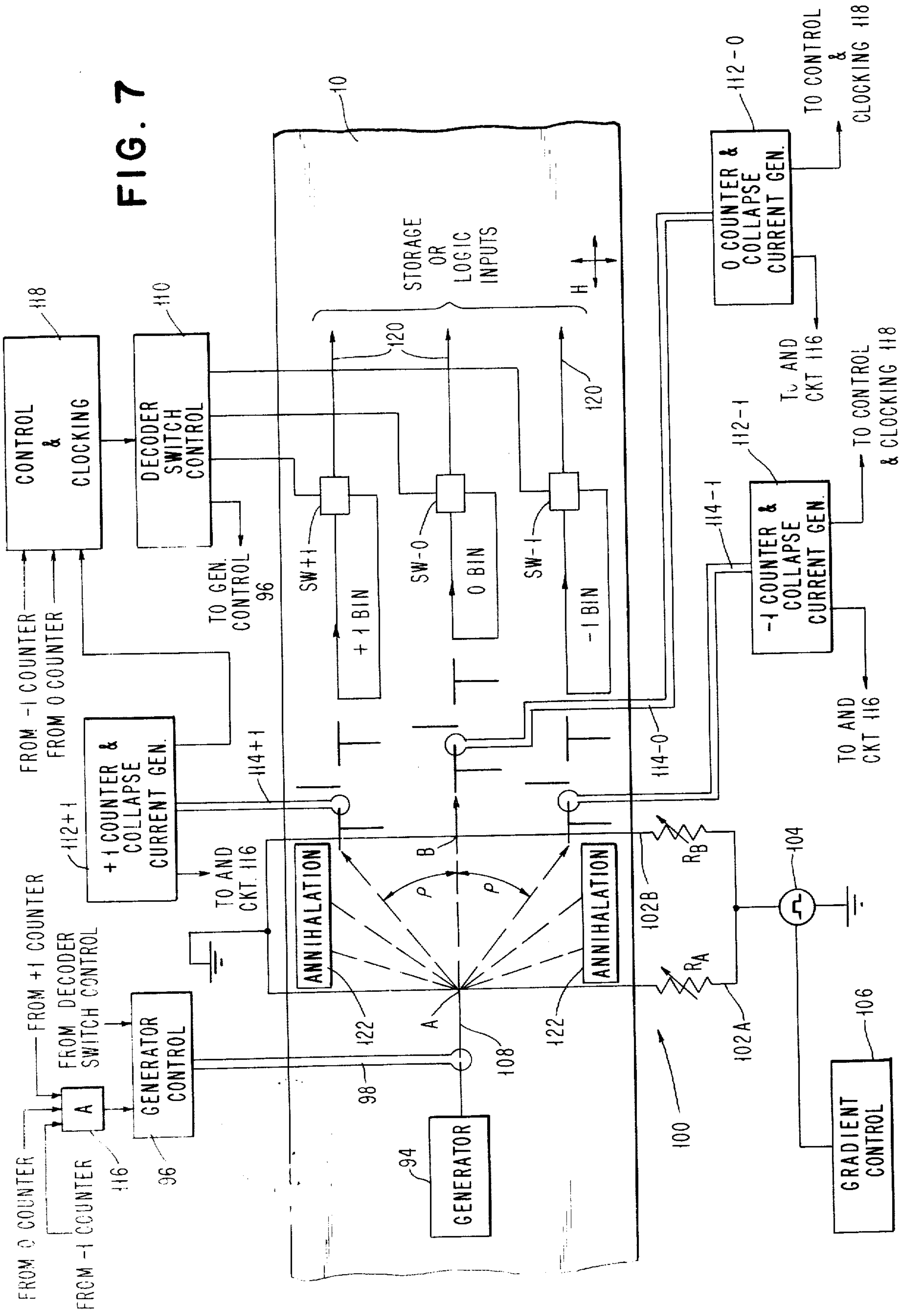
FIG. 7 illustrates in more detail the circuitry used to create multivalued magnetic domains which can be used for storage, logic, or memory.

FIG. 7 shows circuitry for deflecting multistate magnetic domains and for storing domains having different states at different locations in a magnetic material. This circuitry can be used for generating and writing domains having desired information states. Thus, certain features (components 22, 24, and 26 of FIG. 5) are shown. Depending upon activation of various switches, domains having any information state can be provided as storage, memory, or logic inputs to other circuitry on the magnetic material.

In more detail, magnetic sheet 10 has located thereon a generator 94 which produces domains having certain numbers of rotations of the angle Ψ. Generator 94 is the same as that described with respect to FIGS. 6A–6D, or the equivalent. Associated with generator 94 is a generator control 96 which provides current pulses to a conductor 98. Current pulses in conductor 98 collapse domains provided by generator 94, when properly activated, as will be described later.

Also located adjacent magnetic sheet 10 is a deflection means 100. The deflection means in this case is a pair of current-carrying conductors 102A and 102B. Conductors 102A and 102B are connected to a current source 104 through current-limiting variable resistors $R_A$ and $R_B$. Current source 104 is controllably operated by gradient control unit 106.

Deflection means 100 can be provided by a plurality of structures. This structure produces a magnetic field having a gradient which, as explained previously, will deflect domains which move into the region where the gradient exists. The gradient producing means 100 can comprise current-carrying conductors as shown, permanent magnets selected to provide different magnetic biases, and layers of magnetic material exchange coupled to the magnetic sheet 10 having graded properties to provide the gradient. when permanent magnets are used, different amplitudes of magnetic field can be provided in different regions of sheet 10 by varying the separation of the permanent magnets from sheet 10. When exchange-coupled layers are used, the thickness of these layers is varied to provide the gradient. These are well-known equivalents, and need not be discussed further. Additionally, the magnetic properties of material 10 may be altered to provide the gradient.

Domains produced by generator 94 propagate in the direction of arrow 108 until they reach point A. The net bias field at point A is different than that at point B and the domains will be deflected in accordance with their wall-moment rotational properties. In this drawing, domains having ±1 rotation will be deflected through angle ρ and will be sent to a storage location defined as the "±1 bin". Domains having zero rotations of angle Ψ will not be deflected and will be propagated to a storage location designated zero bin. Domains having −1 rotation will be deflected through an angle −ρ and will propagate to the storage area labeled "−1 bin." These bins are conventional storage locations and can be, for instance, closed loop shift registers around which the domains continuously travel.

Generally, it is desirable (but not essential) that all the bins contain the same number of domains and that information be selectively switched from the bins as desired. However, because some generators can produce a statistical distribution of domains having various rotations, circuitry is provided to keep track of when each bin is fully loaded. When a bin is fully loaded, means are provided to collapse other domains having similar properties which would normally enter that bin. This continues until all bins have a full supply of the domains which they are storing. Of course, other design considerations may be readily apparent to those skilled in the art. If the domain generator is one which produces domains having defined numbers of Bloch lines and therefore rotation state, then the various storage bins and related circuitry can be substantially eliminated or reduced in complexity. Another alternative is to use a plurality of domain generators which provide domains having different rotational states.

Associated with each bin is a switch SW+1, SW0 and SW−1, respectively. These are switches operable under control of the decoder switch control unit 110. These switches pass domains in one of two directions depending upon whether domains are to be taken from the bin or allowed to recirculate in the bin. Such switches will be more fully described with reference to FIG. 8.

Each storage bin has associated therewith circuitry for counting the domains which enter the bin and circuitry for collapsing domains which try to enter the bin after the bin is fully loaded. Generally, this circuitry comprises a counter which merely counts the number of domains entering the bin and a current source for producing a current whose magnetic field is sufficient to collapse unwanted domains which propagate in the direction of the bin. For instance, +1 counter and collapse current generator 112 +1 is associated with the +1 bin. Counter 112 +1 detects domains having +ρ deflection via conductor loop 114+1. After the number of domains required to fill the +1 bin have been counted, unit 112+1 provides a current pulse in conductor 114+1 which then destroys any other domain trying to enter the +1 bin. In a similar manner the 0 bin has associated therewith a zero counter and collapse current generator 112–0, which is coupled to the 0 bin propagation path by conductor 114–0. In the same manner, the −1 bin has associated therewith −1 counter and collapse current generator 112–1, and conductor 114–1. These counter and collapse current generators provide inputs to AND circuit 116 which, upon coincidence of all inputs, provides a signal to generator control 96. This signal causes generator control 96 to produce a current pulse in conductor 98 which stops the further passage of domains in the direction of arrow 108.

The counter and collapse current generators also provide inputs to a unit entitled Control and Clocking 118 which in turn controllably activates the decoder switch control 110. Thus, control unit 118 provides a signal to the decoder switch control 110 after receiving signals from all of the control and clocking units 112, in order to signal decoder switch control 110 that removal of domains from the storage bins can occur. In this manner, it is possible to selectively remove domains from the storage bins for propagation along the direction of arrows 120.

Thus, FIG. 7 shows circuitry for providing, in a reproducible manner, domains having a plurality of different properties so that inputs suitable for storage, logic, or memory are obtained. In this particular example, any domains having deflections other than the deflections utilized are propagated to annihilators 122 where they are destroyed. However, these other domains could be utilized elsewhere by other circuitry, not shown.

As is apparent from FIG. 7, conventional propagation circuits can be used to move domains having different wallmoment rotational states. That is, conventional conductor circuitry or circuitry using magnetically soft elements can be utilized.

The domains stored in the various bins provide multilevel informational states. As is known in the logic design art, any word can be written by using domains of two different types in combination with a single domain of a third type. In this case it is not required that the number of domains of given kind be changed. Thus, ternary or higher level logic can be provided, as well as functional memories.

SWITCH

Figure 8:
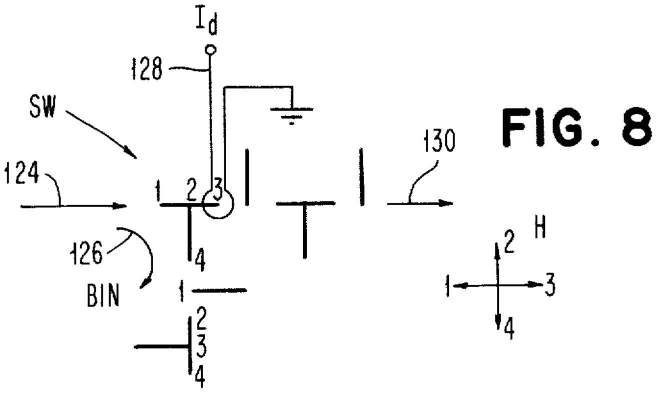
FIG. 8 is a circuit diagram of a switch which is suitable for use in the embodiment of FIG. 7.

FIG. 8 shows a conventional switch which can be used for any of the switches SW+1, SW–0, and SW–1 of FIG. 7. In more detail, the switch can be comprised of magnetically soft elements, such as T and I-bars for propagation of domains. Domains enter the switch SW along the direction indicated by arrow 124. The arrow 126 indicates the general propagation direction in any of the bins. The switch includes a current-carrying conductor 128 which is provided with a current $I_d$ from decoder switch control 110 (FIG. 7). Current $I_d$ is a pulse current used to impede the propagation of a domain in the switch.

In operation, a domain entering switch SW along the direction of arrow 124 will prefer to propagate to the right and leave the switch in the direction indicated by arrow 130. However, if a current pulse $I_d$ is present in conductor 128 when propagation field H is switching from direction 2 to direction 3, the domain located at pole position 2 of T-bar 132 will not experience an attractive magnetic pole at pole position 3 of T-bar 132, since the magnetic field produced by current in conductor 128 will cancel the attractive magnetic pole. Consequently, the domain will remain at position 2 of T-bar 132 and will move to position 4 of this T-bar as magnetic field H continues to rotate. In this way, domains will remain in the storage bin as long as current $I_d$ flows in conductor 128. When it is desired to remove the domain from the bin, current $I_d$ is reduced and domains will then propagate in the direction of arrow 130. Of course, the switch can easily be designed so that domains leave the bins only when currents $I_d$ are present in conductor 128.

READ MEANS

Figure 9:
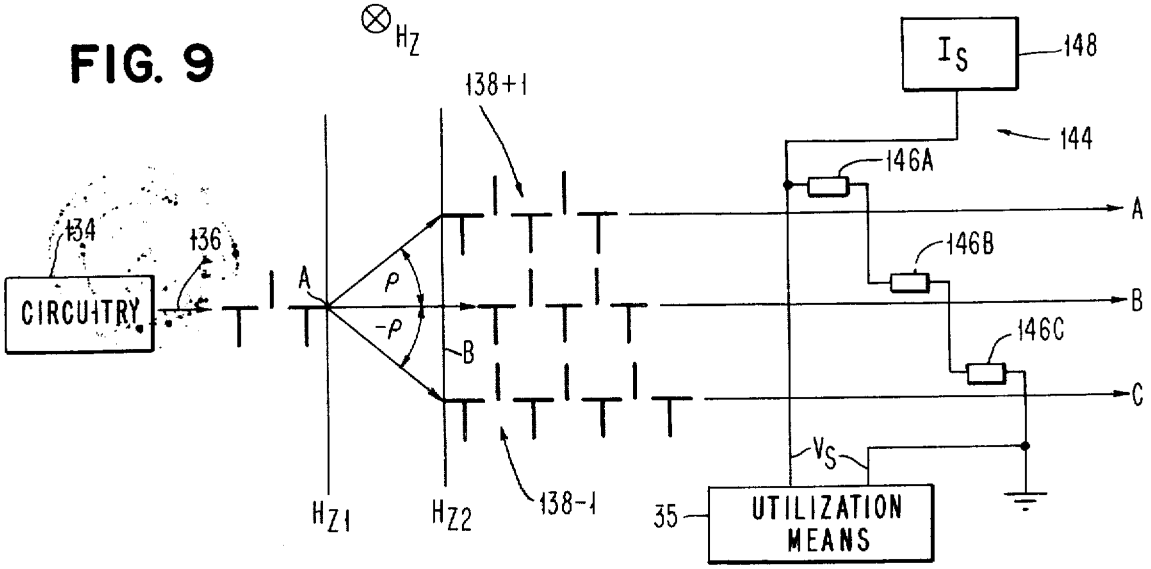
FIG. 9 is a circuit illustrating a possible sensing means for detection of multi-value domains.

FIG. 9 shows circuitry suitable for detection of domains having different rotational states. Portions of this circuitry are similar to the circuitry already described with respect to FIG. 7. FIG. 9 illustrates, for example, components 28, 32 and 35 of FIG. 5.

In more detail, circuitry 134 may be storage, logic, etc. which provides domains having various values of revolution of the angle Ψ, as previously described. These domains travel to the right in the direction of arrow 136 and experience a gradient magnetic field at point A. This causes deflection of the domains with ±1 rotation and the domains so deflected are propagated by associated propagation means 138+1 and 138–1. The propagation means 138–0 is provided for the domains which are not deflected in the gradient magnetic field. The number of propagation means 138 is determined in terms of the number of different types of domains used in the system. Thus, in FIG. 9, it is assumed that three different types of domains are utilized.

Associated with each propagation means 138 is a sensing device generally indicated by the numeral 144. In this case, the sensing device 144 is comprised of sensing elements 146A, 146B, and 146C. In a preferred embodiment these would be magnetoresistive sensing elements although any type of sensing element can be used. The sensing elements are connected in series to a current source 148 which provides the measuring current $I_s$. The sensing elements 146A, 146B, and 146C are spatially staggered with respect to one another so that a single sense amplifier can be used. That is, domains in path A will be sensed first, after which domains in path B will be sensed, and then domains in path C. Thus, the spatial staggering of sensing elements 146 results in a time multiplexed output signal to utilization means 35 (for instance, a computer). This type of sensing scheme is more fully explained in U.S. Pat. No. 3,720,928.

Thus, any type of reading means can be utilized and generally the property of the domains that their deflection depends upon the number of rotations of the angle Ψ is utilized in the read means. This provides a sensitive detection means for domains having different dynamic properties. After sensing the domains can be utilized as logic inputs, returned to storage, destroyed, etc.

What has been described is a new information handling apparatus utilizing domains having multistates in the same magnetic material. In contrast with prior art schemes, information is stored as the presence of domains having different dynamic properties, rather than as the presence and absence of domains. This leads to increased computing capability, and storage which significantly differs from known types of magnetic domain storage. Any type of magnetic domain material can be used, and the circuitry can be generally comprised of known structures. In addition, good separation results between domains which undergo different deflections in a gradient magnetic field, so that good resolution and reliable storage capability is possible.

What is claimed is:

1. An information handling apparatus using cylindrical magnetic domains, comprising:

a magnetic medium capable of supporting said cylindrical domains, said domains having domain walls in which wall magnetization exists, generating means for controllably producing bubble domains having desired amounts of rotation of said wall magnetization around the periphery of said domain walls, said amounts of rotation being indicative of said information, reading means for determining said amount of rotation of wall magnetization in said domains for detecting said information.

2. The apparatus of claim 1, further including storage means for storing said domains.

3. The apparatus of claim 1, including propagation means for moving said domains in said magnetic medium.

4. The apparatus of claim 1, where said reading means includes means for producing a gradient magnetic field in a direction substantially parallel to an easy axis of magnetization of said magnetic medium, and sensors for detecting said domains after movement in said gradient magnetic field.

5. The apparatus of claim 1, where said generating means includes means for applying pulse magnetic fields to said domains, where said pulse magnetic fields are substantially parallel to an easy direction of magnetization of said medium, said pulse magnetic fields having different amplitudes in different regions of the walls of said domains.

6. The apparatus of claim 1, where said generating means includes means for splitting said domains to produce domains having desired information states.

7. The apparatus of claim 6, where said means for splitting domains is comprised of current-carrying conductors.

8. The apparatus of claim 6, where said means for splitting domains is comprised of magnetically soft elements, and a source of a reorienting magnetic field in a direction substantially normal to an easy direction of magnetization of said medium.

9. An information handling apparatus using cylindrical magnetic domains, comprising:

a magnetic medium in which said domains can exist, means for controllably producing domains having specified different directions of motion in a gradient magnetic field substantially parallel to an easy axis of magnetization of said medium, said different directions of motion being indicative of the information states of domains in said apparatus, read means for detecting said different information states, said read means producing said gradient magnetic field.

10. The apparatus of claim 9, including means for moving said domains of different information states in said magnetic medium.

11. The apparatus of claim 9, further including sensors for detecting said domains after movement in said gradient magnetic field.

12. The apparatus of claim 9, where said read means includes means for determining the direction of motion of said domains in said gradient magnetic field.

13. The apparatus of claim 9, where said generating means includes means for splitting magnetic bubble domains to produce domains having different information states.

14. The apparatus of claim 9, including means for storing said domains having different information states.

15. The apparatus of claim 14, including input means for placing domains having different information states into said storage means and output means for selectively removing said domains from said storage.

16. The apparatus of claim 9, including means for separating domains in accordance with said different information states.

17. The apparatus of claim 16, including storage means for separately storing domains of different information state.

18. The apparatus of claim 17, including means for selectively accessing domains stored separately.

19. A magnetic bubble domain apparatus for storage of information represented by said bubble domains, comprising:

a magnetic medium for supporting said bubble domains, said domains having domain walls in which wall magnetization exists, generating means for producing first bubble domains having no vertical Bloch lines in their domain walls and second bubble domains having two vertical Bloch lines in their domain walls, storage means for storing said first and second bubble domains, said first and second bubble domains being representative of said information, reading means for determining the information state of said bubble domains in said storage means, said reading means being responsive to the number of vertical Bloch lines in said first and second bubble domains.

20. The apparatus of claim 19, where said generating means is comprised of a conductor and a current source connected thereto for applying localized magnetic fields substantially along an easy direction of magnetization of said magnetic medium.

21. The apparatus of claim 19, where said reading means includes field means for producing a gradient magnetic field for movement of said first and second domains, and at least one sensor for detection of the presence of said first or second domains.

22. A magnetic bubble domain apparatus for storage of information represented by said bubble domains, comprising:

a magnetic medium for supporting magnetic bubble domains representative of said information, each said domain being characterized by a domain wall in which wall magnetization exists, the amount of rotation of said magnetization around a domain wall being the number of revolutions of said wall magnetization, storage means for storage of domains representing said information, said storage means having therein first domains having one revolution of their wall magnetizatioin and second domains having zero revolution of their wall magnetization, said first and second domains being representative of information in said apparatus.

23. The apparatus of claim 22, further including generating means for providing said first and second domains, and reading means for detecting said first and second domains.

24. An apparatus using magnetic bubble domains for representation of information, comprising:
a magnetic medium for supporting magnetic bubble domains representative of said information, each said domain being characterized by a domain wall in which wall magnetization exists, the amount of rotation of said magnetization around a domain wall being the number of revolutions of said wall magnetization,
storage means for storage of domains representing said information, said storage means having therein domains having one revolution of wall magnetization.

25. The apparatus of claim 24, further including generating means for controllably producing domains having one revolution of wall magnetization and reading means for sensing said domains.

26. A magnetic bubble domain apparatus for storage of information represented by said bubble domains, comprising:
a magnetic medium for supporting said bubble domains, said domains having domain walls in which wall magnetization exists, said domains being further characterized by their direction of movement in a gradient magnetic field,
generating means for producing first bubble domains having a first direction of movement with respect to said gradient and second bubble domains having a second direction of movement with respect to said gradient,
storage means for storing information represented by said first and second domains,
reading means for sensing said first and second domains, said reading means including means for producing said gradient magnetic field and sensor means for detecting the presence of said first and second domains in accordance with their direction of movement in said gradient magnetic fields.

27. The apparatus of claim 26, where said first domains move along the direction of said field gradient while said second domains move along a direction which is at an angle to said field gradient.

28. The apparatus of claim 26, where said first domains move at a first angle to said gradient and said second domains move at a second angle to said gradient.

29. A method of storage of information, comprising the steps of:
generating domains having zero revolutions of their wall magnetization measured around the periphery of the domain wall of these domains, and for generating domains having ±1 revolution of wall magnetization measured around the periphery of the domain wall of the second domain,
selecting domains for storage from said zero and ±1 revolution domains for representation of said information in accordance with the number of revolutions of said wall magnetization,
storing selected domains at certain locations in a magnetic medium,
reading said information states of said domains by detecting said number of revolutions of wall magnetization in said selected domains.

30. The method of claim 29, where said selected domains include said zero revolution domain.

31. The method of claim 29, where said selected domains include said 1 revolution domains.

32. A method for information handling, comprising the steps of:
generating magnetic bubble domains in a magnetic medium, said bubble domains having specified numbers of vertical Bloch lines in their domain walls,
selecting domains having two different numbers of said vertical Bloch lines in their domain walls for storage of information, said information being represented by said selected domains having two different numbers of vertical Bloch lines therein,
storing said selected domains in different locations of said magnetic medium,
reading said information by detecting said selected domains in accordance with the number of vertical Bloch lines in said domain walls.

* * * * *